(12) United States Patent
Botros et al.

(10) Patent No.: US 12,062,363 B2
(45) Date of Patent: *Aug. 13, 2024

(54) TIED AND REDUCED RNN-T

(71) Applicant: Google LLC, Mountain View, CA (US)

(72) Inventors: Rami Botros, Mountain View, CA (US); Tara Sainath, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/347,842

(22) Filed: Jul. 6, 2023

(65) Prior Publication Data

US 2023/0352006 A1 Nov. 2, 2023

Related U.S. Application Data

(63) Continuation of application No. 17/330,446, filed on May 26, 2021, now Pat. No. 11,727,920.

(60) Provisional application No. 63/165,030, filed on Mar. 23, 2021.

(51) Int. Cl.
  *G10L 15/16* (2006.01)
  *G10L 15/08* (2006.01)

(52) U.S. Cl.
  CPC ............ *G10L 15/16* (2013.01); *G10L 15/083* (2013.01)

(58) Field of Classification Search
  CPC ............................ G10L 115/16; G10L 15/083
  USPC ....................................................... 704/232
  See application file for complete search history.

(56) References Cited

U.S. PATENT DOCUMENTS

| | | | |
|---|---|---|---|
| 10,170,110 B2 | 1/2019 | Zhou et al. | |
| 10,504,010 B2 | 12/2019 | Mao et al. | |
| 10,733,380 B2 | 8/2020 | Leidner et al. | |
| 11,132,988 B1 | 9/2021 | Steedman Henderson et al. | |
| 11,217,231 B2 | 1/2022 | Prabhavalkar et al. | |
| 11,315,548 B1* | 4/2022 | Heikinheimo | G10L 15/065 |
| 11,367,431 B2 | 6/2022 | Bonafonte et al. | |
| 11,373,639 B2* | 6/2022 | Moritz | G06N 3/045 |
| 11,423,883 B2 | 8/2022 | Prabhavalkar et al. | |
| 11,727,920 B2* | 8/2023 | Botros | G06N 3/044 |
| | | | 704/232 |
| 2022/0310071 A1 | 9/2022 | Botros et al. | |
| 2023/0130634 A1* | 4/2023 | Sainath | G06N 3/0442 |
| | | | 704/232 |

OTHER PUBLICATIONS

USPTO. Office Action relating to U.S. Appl. No. 17/330,446, dated Dec. 14, 2022.

* cited by examiner

*Primary Examiner* — Susan I McFadden
(74) *Attorney, Agent, or Firm* — Honigman LLP; Brett A. Krueger; Grant Griffith

(57) ABSTRACT

A recurrent neural network-transducer (RNN-T) model improves speech recognition by processing sequential non-blank symbols at each time step after an initial one. The model's prediction network receives a sequence of symbols from a final Softmax layer and employs a shared embedding matrix to create and map embeddings to each symbol, associating them with unique position vectors. These embeddings are weighted according to their similarity to their matching position vector. Subsequently, a joint network of the RNN-T model uses these weighted embeddings to output a probability distribution for potential speech recognition hypotheses at each time step, enabling more accurate transcriptions of spoken language.

20 Claims, 6 Drawing Sheets

TIED AND REDUCED RNN-T

CROSS REFERENCE TO RELATED APPLICATIONS

This U.S. patent application is a continuation of, and claims priority under 35 U.S.C. § 120 from, U.S. patent application Ser. No. 17/330,446, filed on May 26, 2021, which priority under 35 U.S.C. § 119(e) to U.S. Provisional Application 63/165,030, filed on Mar. 23, 2021. The disclosures of these prior applications are considered part of the disclosure of this application and are hereby incorporated by reference in their entireties.

TECHNICAL FIELD

This disclosure relates to a tied and reduced recurrent neural network-transducer (RNN-T) model.

BACKGROUND

Modern automated speech recognition (ASR) systems focus on providing not only high quality (e.g., a low word error rate (WER)), but also low latency (e.g., a short delay between the user speaking and a transcription appearing). Moreover, when using an ASR system today there is a demand that the ASR system decode utterances in a streaming fashion that corresponds to real-time or even faster than real-time. To illustrate, when an ASR system is deployed on a mobile phone that experiences direct user interactivity, an application on the mobile phone using the ASR system may require the speech recognition to be streaming such that words appear on the screen as soon as they are spoken. Here, it is also likely that the user of the mobile phone has a low tolerance for latency. Due to this low tolerance, the speech recognition strives to run on the mobile device in a manner that minimizes an impact from latency and inaccuracy that may detrimentally affect the user's experience.

SUMMARY

One aspect of the disclosure provides a recurrent neural network-transducer (RNN-T) model that includes a prediction network configured to, at each of a plurality of time steps subsequent to an initial time step, receive, as input, a sequence of non-blank symbols output by a final Softmax layer. The prediction network is also configured to, for each non-blank symbol in the sequence of non-blank symbols received as input at the corresponding time step: generate, using a shared embedding matrix, an embedding of the corresponding non-blank symbol; assign a respective position vector to the corresponding non-blank symbol; and weight the embedding proportional to a similarity between the embedding and the respective position vector. The prediction network is also configured to generate, as output, a single embedding vector at the corresponding time step, the single embedding vector based on a weighted average of the weighted embeddings. The RNN-T model also includes a joint network configured to, at each of the plurality of time steps subsequent to the initial time step: receive, as input, the single embedding vector generated as output from the prediction network at the corresponding time step; and generate a probability distribution over possible speech recognition hypotheses at the corresponding time step.

Implementations of the disclosure may include one or more of the following optional features. In some implementations, the RNN-T model further includes an audio encoder configured to receive, as input, a sequence of acoustic frames and generate, at each of the plurality of time steps, a higher order feature representation for a corresponding acoustic frame in the sequence of acoustic frames. Here, the joint network is further configured to, at each of the plurality of time steps, receive the higher order feature representation generated by the audio encoder at the corresponding time step as input. In some examples, weighting the embedding proportional to the similarity between the embedding and the respective position vector includes weighting the embedding proportional to a cosine similarity between the embedding and the respective position vector. The sequence of non-blank symbols output by the final Softmax layer include wordpieces. Optionally, the sequence of non-blank symbols output by the final Softmax layer may include graphemes. Each of the embeddings may include a same dimension size as each of the position vectors. In some implementations, the sequence of non-blank symbols received as input is limited to the N previous non-blank symbols output by the final Softmax layer. In these implementations, N may be equal to two. Alternatively, N may be equal to five.

In some examples, the prediction network includes a multi-headed attention mechanism that shares the shared embedding matrix across each head of the multi-headed attention mechanism. In these examples, at each of the plurality of time steps subsequent to the initial time step the prediction network is configured to, at each head of the multi-headed attention mechanism, and for each non-blank symbol in the sequence of non-blank symbols received as input at the corresponding time step: generate, using the shared embedding matrix, the same embedding of the corresponding non-blank symbol as the embedding generated at each other head of the multi-headed attention mechanism; assign a different respective position vector to the corresponding non-blank symbol than the respective position vector assigned to the corresponding non-blank symbol at each other head of the multi-headed attention mechanism; and weight the embedding proportional to the similarity between the embedding and the respective position vector. Here, the prediction network is also configured to generate, as output from the corresponding head of the multi-headed attention mechanism, a respective weighted average of the weighted embeddings of the sequence of non-blank symbols and generate, as output, the single embedding vector at the corresponding time step by averaging the respective weighted averages output from the corresponding heads of the multi-headed attention mechanisms. In these examples, the multi-headed attention mechanism may include four heads. Optionally, the prediction network may tie a dimensionality of the shared embedding matrix to a dimensionality of an output layer of the joint network.

Another aspect of the disclosure provides a computer-implemented method that when executed on data processing hardware causes the data processing hardware to perform operations. At each of a plurality of time steps subsequent to an initial time step, the operations include: receiving, as input to a recurrent neural network-transducer (RNN-T) model, a sequence of non-blank symbols output by a final Softmax layer; for each non-blank symbol in the sequence of non-blank symbols received as input at the corresponding time step: generating, by the prediction network, using a shared embedding matrix, and embedding of the corresponding non-blank symbol; assigning, by the prediction network, a respective position vector to the corresponding non-blank symbol; and weighting, by the prediction network, the embedding proportional to a similarity between the embedding and the respective position vector. At each of the plurality of time steps subsequent to the initial time step, the operations also include: generating, as output from the prediction network, a single embedding vector at the corresponding time step; and generating, by a joint network of the RNN-T model, using the single embedding vector generated as output from the prediction network at the corresponding time step, a probability distribution over possible speech recognition hypotheses at the corresponding time step. The single embedding vector is based on a weighted average of the weighted embeddings.

Implementations of the disclosure may include one or more of the following optional features. In some implementations, the operations further include: receiving, as input to an audio encoder, a sequence of acoustic frames; generating, by the audio encoder, at each of the plurality of time steps, a higher order feature representation for a corresponding acoustic frame in the sequence of acoustic frames; and receiving, as input to the joint network, the higher order feature representation generated by the audio encoder at the corresponding time step. In some examples, weighting the embedding proportional to the similarity between the embedding and the respective position vector includes weighting the embedding proportional to a cosine similarity between the embedding and the respective position vector.

The sequence of non-blank symbols output by the final Softmax layer may include wordpieces. Optionally, the sequence of non-blank symbols output by the final Softmax layer may include graphemes. Each of the embeddings may include a same dimension size as each of the position vectors. In some implementations, the sequence of non-blank symbols received as input is limited to the N previous non-blank symbols output by the final Softmax layer. In these implementations, N may be equal to two. Alternatively, N may be equal to five. Optionally, the prediction network may tie a dimensionality of the shared embedding matrix to a dimensionality of an output layer of the joint network.

In some examples, the prediction network includes a multi-headed attention mechanism that shares the shared embedding matrix across each head of the multi-headed attention mechanism. The multi-headed attention mechanism may include four heads. In these examples, at each of the plurality of time steps subsequent to the initial time step, the operations may further include, at each head of the multi-headed attention mechanism, and for each non-blank symbol in the sequence of non-blank symbols received as input at the corresponding time step: generating, by the prediction network and using the shared embedding matrix, the same embedding of the corresponding non-blank symbol as the embedding generated at each other head of the multi-headed attention mechanism; assigning, by the prediction network, a different respective position vector to the corresponding non-blank symbol than the respective position vector assigned to the corresponding non-blank symbol at each other head of the multi-headed attention mechanism; and weighting, by the prediction network, the embedding proportional to the similarity between the embedding and the respective position vector. Here, at each of the plurality of time steps subsequent to the initial time step and at each head of the multi-headed attention mechanism, the operations may also include generating, by the prediction network as output from the corresponding head of the multi-headed attention mechanism, a respective weighted average of the weighted embeddings of the sequence of non-blank symbols. Thereafter, at each of the plurality of time steps subsequent to the initial time step, the operations may further include generating, as output from the prediction network, the single embedding vector at the corresponding time step by averaging the respective weighted averages output from the corresponding heads of the multi-headed attention mechanisms.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
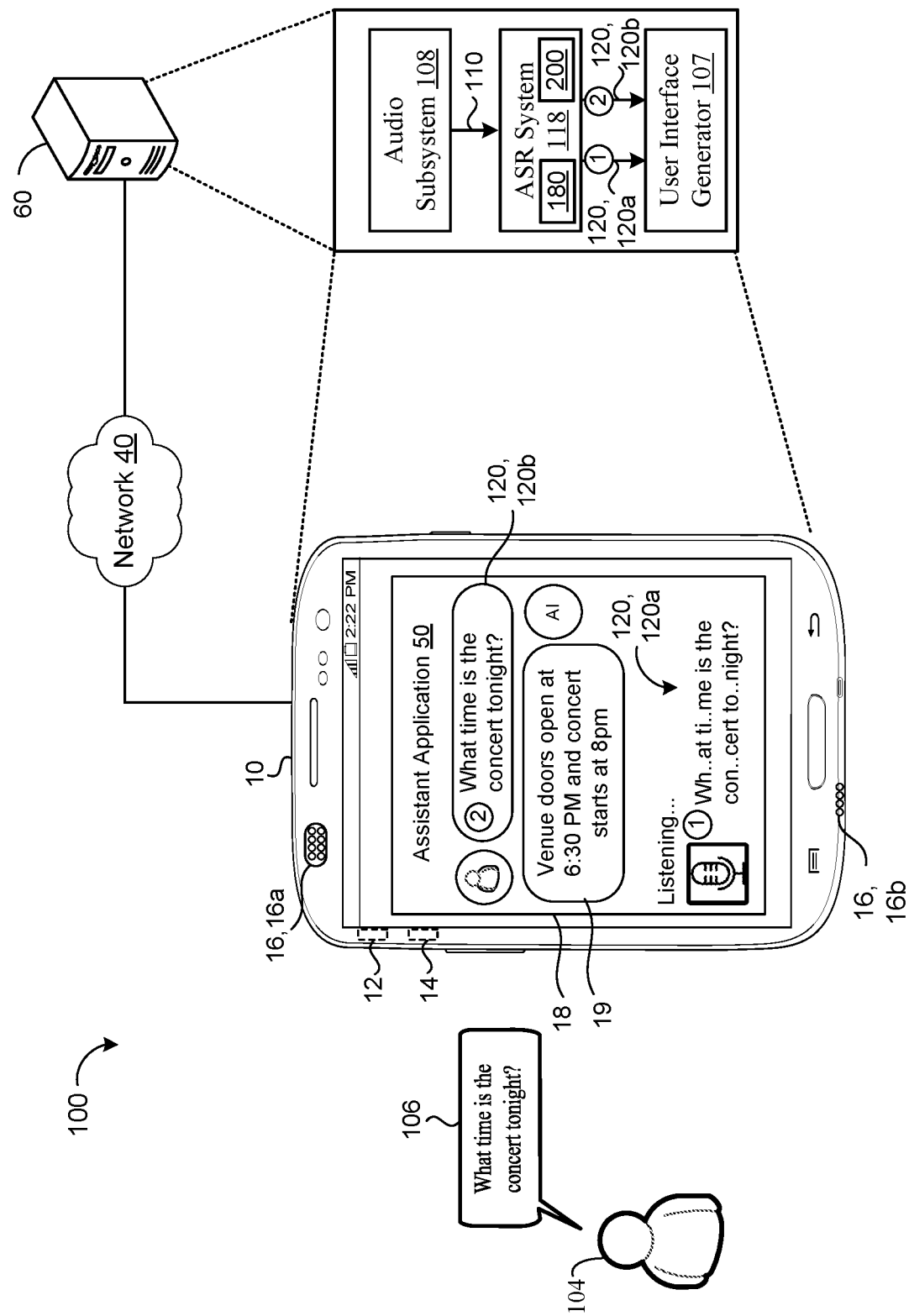
FIG. 1 is a schematic view of an example speech environment using a recurrent neural network-transducer (RNN-T) model for transcribing speech.

FIG. 1 is an example of a speech environment 100. In the speech environment 100, a user's 104 manner of interacting with a computing device, such as a user device 10, may be through voice input. The user device 10 (also referred to generally as a device 10) is configured to capture sounds (e.g., streaming audio data) from one or more users 104 within the speech environment 100. Here, the streaming audio data may refer to a spoken utterance 106 by the user 104 that functions as an audible query, a command for the device 10, or an audible communication captured by the device 10. Speech-enabled systems of the device 10 may field the query or the command by answering the query and/or causing the command to be performed/fulfilled by one or more downstream applications.

The user device 10 may correspond to any computing device associated with a user 104 and capable of receiving audio data. Some examples of user devices 10 include, but are not limited to, mobile devices (e.g., mobile phones, tablets, laptops, etc.), computers, wearable devices (e.g., smart watches), smart appliances, internet of things (IoT) devices, vehicle infotainment systems, smart displays, smart speakers, etc. The user device 10 includes data processing hardware 12 and memory hardware 14 in communication with the data processing hardware 12 and stores instructions, that when executed by the data processing hardware 12, cause the data processing hardware 12 to perform one or more operations. The user device 10 further includes an audio system 16 with an audio capture device (e.g., microphone) 16, 16a for capturing and converting spoken utterances 106 within the speech environment 100 into electrical signals and a speech output device (e.g., a speaker) 16, 16b for communicating an audible audio signal (e.g., as output audio data from the device 10). While the user device 10 implements a single audio capture device 16a in the example shown, the user device 10 may implement an array of audio capture devices 16a without departing from the scope of the present disclosure, whereby one or more capture devices 16a in the array may not physically reside on the user device 10, but be in communication with the audio system 16.

In the speech environment 100, an automated speech recognition (ASR) system 118 implementing a recurrent neural network-transducer (RNN-T) model 200 and an optional rescorer 180 resides on the user device 10 of the user 104 and/or on a remote computing device 60 (e.g., one or more remote servers of a distributed system executing in a cloud-computing environment) in communication with the user device 10 via a network 40. The user device 10 and/or the remote computing device 60 also includes an audio subsystem 108 configured to receive the utterance 106 spoken by the user 104 and captured by the audio capture device 16a, and convert the utterance 106 into a corresponding digital format associated with input acoustic frames 110 capable of being processed by the ASR system 118. In the example shown, the user speaks a respective utterance 106 and the audio subsystem 108 converts the utterance 106 into corresponding audio data (e.g., acoustic frames) 110 for input to the ASR system 118. Thereafter, the RNN-T model 200 receives, as input, the audio data 110 corresponding to the utterance 106, and generates/predicts, as output, a corresponding transcription 120 (e.g., recognition result/hypothesis) of the utterance 106. In the example shown, the RNN-T model 200 may perform streaming speech recognition to produce an initial speech recognition result 120, 120a and the rescorer 180 may update (i.e., rescore) the initial speech recognition result 120a to produce a final speech recognition result 120, 120b.

The user device 10 and/or the remote computing device 60 also executes a user interface generator 107 configured to present a representation of the transcription 120 of the utterance 106 to the user 104 of the user device 10. As described in greater detail below, the user interface generator 107 may display the initial speech recognition results 120a in a streaming fashion during time 1 and subsequently display the final speech recognition result 120b during time 2. In some configurations, the transcription 120 output from the ASR system 118 is processed, e.g., by a natural language understanding (NLU) module executing on the user device 10 or the remote computing device 60, to execute a user command/query specified by the utterance 106. Additionally or alternatively, a text-to-speech system (not shown) (e.g., executing on any combination of the user device 10 or the remote computing device 60) may convert the transcription into synthesized speech for audible output by the user device 10 and/or another device.

In the example shown, the user 104 interacts with a program or application 50 (e.g., the digital assistant application 50) of the user device 10 that uses the ASR system 118. For instance, FIG. 1 depicts the user 104 communicating with the digital assistant application 50 and the digital assistant application 50 displaying a digital assistant interface 18 on a screen of the user device 10 to depict a conversation between the user 104 and the digital assistant application 50. In this example, the user 104 asks the digital assistant application 50, "What time is the concert tonight?" This question from the user 104 is a spoken utterance 106 captured by the audio capture device 16a and processed by audio systems 16 of the user device 10. In this example, the audio system 16 receives the spoken utterance 106 and converts it into acoustic frames 110 for input to the ASR system 118.

Continuing with the example, the RNN-T model 200, while receiving the acoustic frames 110 corresponding to the utterance 106 as the user 104 speaks, encodes the acoustic frames 110 and then decodes the encoded acoustic frames 110 into the initial speech recognition results 120a. During time 1, the user interface generator 107 presents, via the digital assistant interface 18, a representation of the initial speech recognition results 120a of the utterance 106 to the user 104 of the user device 10 in a streaming fashion such that words, word pieces, and/or individual characters appear on the screen as soon as they are spoken. In some examples, the first look ahead audio context is equal to zero.

During time 2, the user interface generator 107 presents, via the digital assistant interface 18, a representation of the final speech recognition result 120b of the utterance 106 to the user 104 of the user device 10 rescored by the rescorer 180. In some implementations, the user interface generator 107 replaces the representation of the initial speech recognition results 120a presented at time 1 with the representation of the final speech recognition result 120b presented at time 2. Here, time 1 and time 2 may include timestamps corresponding to when the user interface generator 107 presents the respective speech recognition result 120. In this example, the timestamp of time 1 indicates that the user interface generator 107 presents the initial speech recognition result 120a at an earlier time than the final speech recognition result 120b. For instance, as the final speech recognition result 120b is presumed to be more accurate than the initial speech recognition results 120a, the final speech recognition result 120b ultimately displayed as the transcription 120 may fix any terms that may have been misrecognized in the initial speech recognition results 120a. In this example, the streaming initial speech recognition results 120a output by the RNN-T model 200 are displayed on the screen of the user device 10 at time 1 are associated with low latency and provide responsiveness to the user 104 that his/her query is being processed, while the final speech recognition result 120b output by the rescorer 180 and displayed on the screen at time 2 leverages an additional speech recognition model and/or a language model to improve the speech recognition quality in terms of accuracy, but at increased latency. However, since the initial speech recognition results 120a are displayed as the user speaks the utterance 106, the higher latency associated with producing, and ultimately displaying the final recognition result is not noticeable to the user 104.

In the example shown in FIG. 1, the digital assistant application 50 may respond to the question posed by the user 104 using natural language processing. Natural language processing generally refers to a process of interpreting written language (e.g., the initial speech recognition results 120a and/or the final speech recognition result 120b) and determining whether the written language prompts any action. In this example, the digital assistant application 50 uses natural language processing to recognize that the question from the user 104 regards the user's schedule and more particularly a concert on the user's schedule. By recognizing these details with natural language processing, the automated assistant returns a response 19 to the user's query where the response 19 states, "Venue doors open at 6:30 PM and concert starts at 8 pm." In some configurations, natural language processing occurs on a remote server 60 in communication with the data processing hardware 12 of the user device 10.

Figure 2:
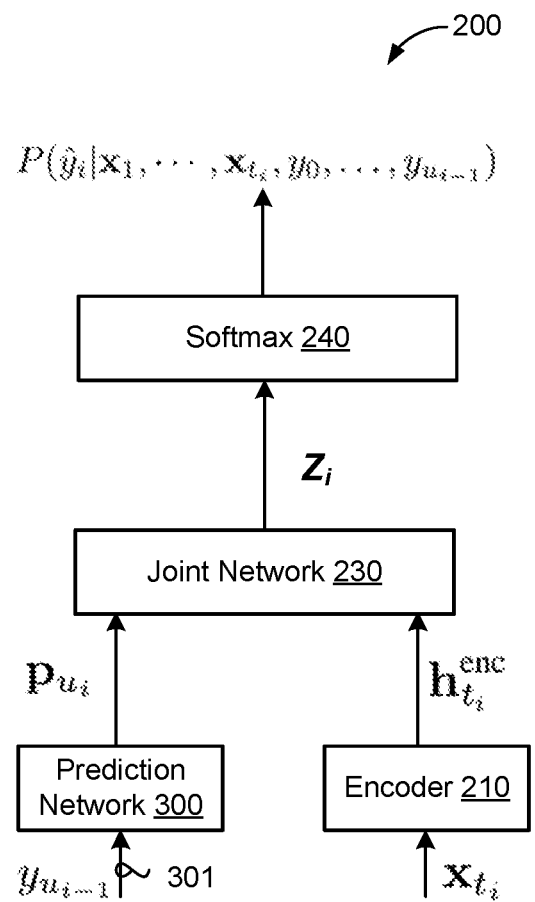
FIG. 2 is a schematic view of an example RNN-T model architecture.

Referring to FIG. 2, an example frame alignment-based transducer model 200 includes a Recurrent Neural Network-Transducer (RNN-T) model architecture which adheres to latency constraints associated with interactive applications. The RNN-T model 200 provides a small computational footprint and utilizes less memory requirements than conventional ASR architectures, making the RNN-T model architecture suitable for performing speech recognition entirely on the user device 102 (e.g., no communication with a remote server is required). The RNN-T model 200 includes an encoder network 210, a prediction network 300, and a joint network 230. The prediction and joint networks 300, 230 may collectively provide an RNN-T decoder. The encoder network 210, which is roughly analogous to an acoustic model (AM) in a traditional ASR system, includes a recurrent network of stacked Long Short-Term Memory (LSTM) layers. For instance, the encoder reads a sequence of d-dimensional feature vectors (e.g., acoustic frames 110 (FIG. 1)) $x=(x_1, x_2, \ldots, x_T)$, where $x_t \in \mathbb{R}^d$, and produces at each time step a higher-order feature representation. This higher-order feature representation is denoted as $h_1^{enc}, \ldots, h_T^{enc}$.

Similarly, the prediction network 300 is also an LSTM network, which, like a language model (LM), processes the sequence of non-blank symbols 301 output by a final Softmax layer 240 so far, $y_0, \ldots, y_{ui-1}$, into a representation $P_{u_i}$. Described in greater detail below, the representation $P_{u_i}$ 350 includes a single embedding vector. Notably, the sequence of non-blank symbols 301 received at the prediction network 300 capture linguistic dependencies between non-blank symbols 301 predicted during the previous time steps so far to assist the joint network 230 in predicting the probability of a next output symbol or blank symbol during the current time step. As described in greater detail below, to contribute to techniques for reducing the size of the prediction network 300 without sacrificing accuracy/performance of the RNN-T model 200, the prediction network 300 may receive a limited-history sequence of non-blank symbols $y_{ui-n}, \ldots, Y_{ui-1}$ that is limited to the N previous non-blank symbols 301 output by the final Softmax layer 240.

Finally, with the RNN-T model architecture, the representations produced by the encoder and prediction networks 210, 300 are combined by the joint network 230. The joint network then predicts $Z_i = P(y_i | x_{t_i}, y_0, \ldots, y_{u_{i-1}})$, which is a distribution over the next output symbol. Stated differently, the joint network 230 generates, at each output step (e.g., time step), a probability distribution over possible speech recognition hypotheses. Here, the "possible speech recognition hypotheses" correspond to a set of output labels each representing a symbol/character in a specified natural language. For example, when the natural language is English, the set of output labels may include twenty-seven (27) symbols, e.g., one label for each of the 26-letters in the English alphabet and one label designating a space. Accordingly, the joint network 230 may output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output distribution of the joint network 230 can include a posterior probability value for each of the different output labels. Thus, if there are 100 different output labels representing different graphemes or other symbols, the output $y_i$ of the joint network 230 can include 100 different probability values, one for each output label. The probability distribution can then be used to select and assign scores to candidate orthographic elements (e.g., graphemes, wordpieces, and/or words) in a beam search process (e.g., by the Softmax layer 240) for determining the transcription 120.

The Softmax layer 240 may employ any technique to select the output label/symbol with the highest probability in the distribution as the next output symbol predicted by the RNN-T model 200 at the corresponding output step. In this manner, the RNN-T model 200 does not make a conditional independence assumption, rather the prediction of each symbol is conditioned not only on the acoustics but also on the sequence of labels output so far. The RNN-T model 200 does assume an output symbol is independent of future acoustic frames 110, which allows the RNN-T model to be employed in a streaming fashion.

In some examples, the encoder network 210 of the RNN-T model 200 is made up of eight 2,048-dimensional LSTM layers, each followed by a 640-dimensional projection layer. In other implementations, the encoder network 210 includes a network of conformer or transformer layers. The prediction network 220 may have two 2,048-dimensional LSTM layers, each of which is also followed by 640-dimensional projection layer as well as an embedding layer of 128 units. Finally, the joint network 230 may also have 640 hidden units. The Softmax layer 240 may be composed of a unified word piece or grapheme set that is generated using all unique word pieces or graphemes in training data. When the output symbols/labels include wordpieces, the set of output symbols/labels may include 4,096 different word pieces. When the output symbols/labels include graphemes, the set of output symbols/labels may include less than 100 different graphemes.

Figure 3:
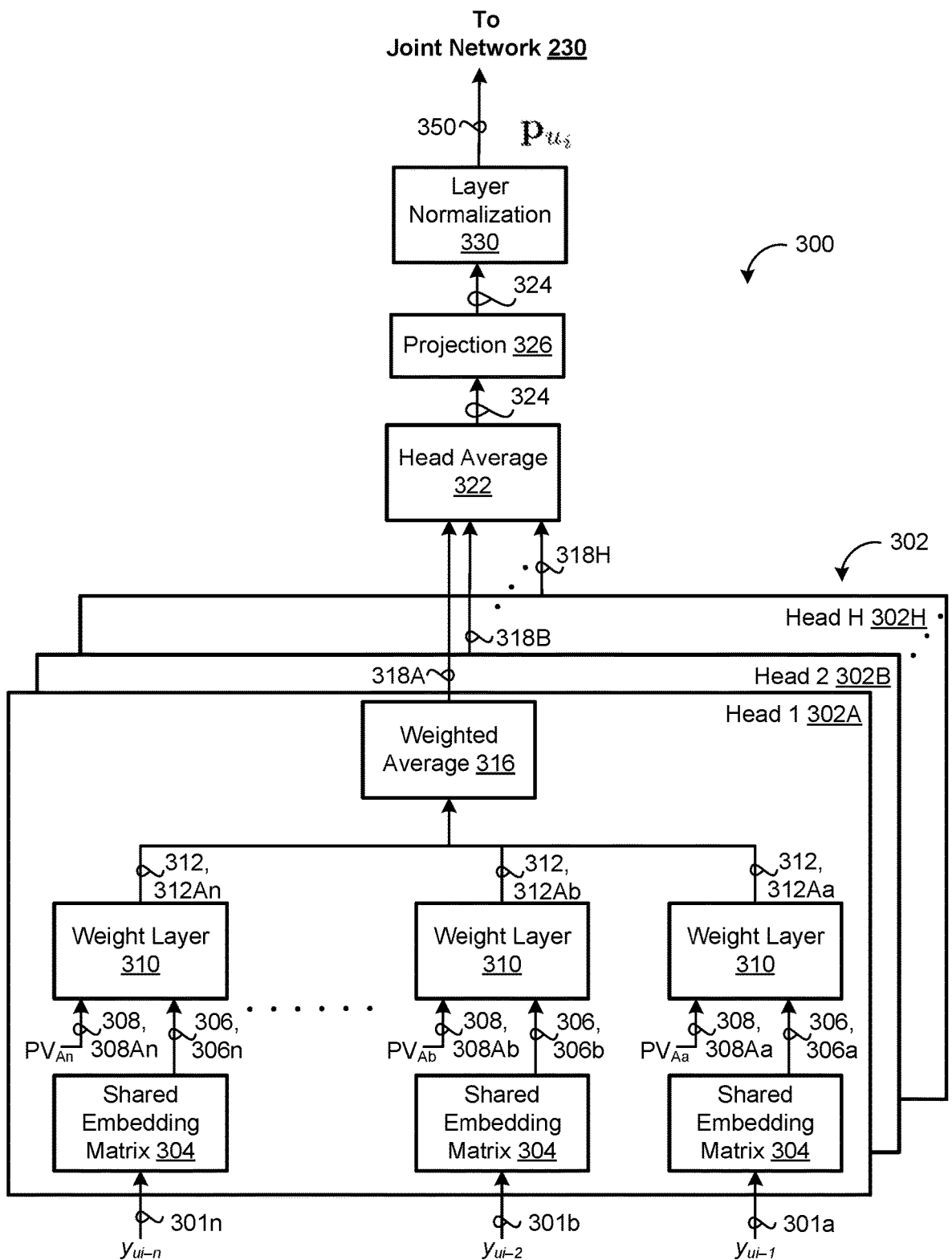
FIG. 3 is a schematic view of an example tied and reduced prediction network of the RNN-T model architecture of FIG. 2.

FIG. 3 shows the prediction network 300 of the RNN-T model 200 receiving, as input, a sequence of non-blank symbols $y_{ui-n} \ldots, u_{ui-1}$ that is limited to the N previous non-blank symbols 301a-n output by the final Softmax layer 240. In some examples, N is equal to two. In other examples, N is equal to five, however, the disclosure is non-limiting and N may equal any integer. The sequence of non-blank symbols 301a-n indicates an initial speech recognition result 120a (FIG. 1). In some implementations, the prediction network 300 includes a multi-headed attention mechanism 302 that shares a shared embedding matrix 304 across each head 302A-302H of the multi-headed attention mechanism. In one example, the multi-headed attention mechanism 302 includes four heads. However, any number of heads may be employed by the multi-headed attention mechanism 302. Notably, the multi-headed attention mechanism improves performance significantly with minimal increase to model size. As described in greater detail below, each head 302A-H includes its own row of position vectors 308, and rather than incurring an increase in model size by concatenating outputs 318A-H from all the heads, the outputs 318A-H are instead averaged by a head average module 322.

Referring to the first head 302A of the multi-headed attention mechanism 302, the head 302A generates, using the shared embedding matrix 304, a corresponding embedding 306, 306a-n (e.g., $X \in \mathbb{R}^{N \times d_e}$) for each non-blank symbol 301 among the sequence of non-blank symbols $_{ui}, \ldots, Y_{ui-1}$ received as input at the corresponding time step from the plurality of time steps. Notably, since the shared embedding matrix 304 is shared across all heads of the multi-headed attention mechanism 302, the other heads 302B-H all generate the same corresponding embeddings 306 for each non-blank symbol. The head 302A also assigns a respective position vector $PV_{Aa-An}$ 308, 308Aa-An (e.g., $P \in$ $\mathbb{R}^{H \times N \times d_e}$) to each corresponding non-blank symbol in the sequence of non-blank symbols $y_{ui-n}, \ldots, y_{ui-1}$. The respective position vector PV 308 assigned to each non-blank symbol indicates a position in the history of the sequence of non-blank symbols (e.g., the N previous non-blank symbols output by the final Softmax layer 240). For instance, the first position vector $PV_{Aa}$ is assigned to a most recent position in the history, while the last position vector $PV_{An}$ is assigned to a last position in the history of the N previous non-blank symbols output by the final Softmax layer 240. Notably, each of the embeddings 306 may include a same dimensionality (i.e., dimension size) as each of the position vectors PV 308.

While the corresponding embedding generated by shared embedding matrix 304 for each for each non-blank symbol 301 among the sequence of non-blank symbols 301a-n, ..., $y_{ui-1}$, is the same at all of the heads 302A-H of the multi-headed attention mechanism 302, each head 302A-H defines a different set/row of position vectors 308. For instance, the first head 302A defines the row of position vectors $PV_{Aa-An}$ 308Aa-An, the second head 302B defines a different row of position vectors $PV_{Ba-Bn}$ 308$_{Ba-Bn}$, ..., and the $H^{th}$ head 302 H defines another different row of position vectors $PV_{Ha-Hn}$ 308$_{Ha-Hn}$.

For each non-blank symbol in the sequence of non-blank symbols 301a-n received, the first head 302A also weights, via a weight layer 310, the corresponding embedding 306 proportional to a similarity between the corresponding embedding and the respective position vector PV 308 assigned thereto. In some examples, the similarity may include a cosine similarity (e.g., cosine distance). In the example shown, the weight layer 310 outputs a sequence of weighted embeddings 312, 312Aa-An each associated the corresponding embedding 306 weighted proportional to the respective position vector PV 308 assigned thereto. Stated differently, the weighted embeddings 312 output by the weight layer 310 for each embedding 306 may correspond to a dot product between the embedding 306 and the respective position vector PV 308. The weighted embeddings 312 may be interpreted as attending over the embeddings in proportion to how similar they are to the positioned associated with their respective position vectors PV 308. To increase computational speed, the prediction network 300 includes non-recurrent layers, and therefore, the sequence of weighted embeddings 312Aa-An are not concatenated, but instead, averaged by a weighted average module 316 to generate, as output from the first head 302A, a weighted average 318A of the weighted embeddings 312Aa-An represented by:

$$\text{Prediction}(X, P) = \frac{1}{H * N} \sum_{h,n} X_n * \sum_e (X_{n,e} * P_{h,n,e}) \quad (1)$$

In Equation 1, h represents the index of the heads 302, n represents position in context, and e represents the embedding dimension. Additionally, in Equation 1, H, N, and $d_e$ include the sizes of the corresponding dimensions. The position vector PV 308 does not have to be trainable and may include random values. Notably, even though the weighted embeddings 312 are averaged, the position vectors PV 308 can potentially save position history information, alleviating the need to provide recurrent connections at each layer of the prediction network 300.

The operations described above with respect to the first head 302A, are similarly performed by each other head 302B-H of the multi-headed attention mechanism 302. Due to the different set of positioned vectors PV 308 defined by each head 302, the weight layer 310 outputs a sequence of weighted embeddings 312Ba-Bn, 312Ha-Hn at each other head 302B-H that is different than the sequence of weighted embeddings 312Aa-Aa at the first head 302A. Thereafter, the weighted average module 316 generates, as output from each other corresponding head 302B-H, a respective weighted average 318B-H of the corresponding weighted embeddings 312 of the sequence of non-blank symbols.

In the example shown, the prediction network 300 includes a head average module 322 that averages the weighted averages 318A-H output from the corresponding heads 302A-H. A projection layer 326 with SWISH may receive, as input, an output 324 from the head average module 322 that corresponds to the average of the weighted averages 318A-H, and generate, as output, a projected output 328. A final layer normalization 330 may normalize the projected output 328 to provide the single embedding vector $Pu_i$ 350 at the corresponding time step from the plurality of time steps. The prediction network 300 generates only a single embedding vector $Pu_i$ 350 at each of the plurality of time steps subsequent to an initial time step.

In some configurations, the prediction network 300 does not implement the multi-headed attention mechanism 302 and only performs the operations described above with respect to the first head 302A. In these configurations, the weighted average 318A of the weighted embeddings 312Aa-An is simply passed through the projection layer 326 and layer normalization 330 to provide the single embedding vector $Pu_i$ 350.

Referring back to FIG. 2, the joint network 230 receives the single embedding vector $Pu_i$ 350 from the prediction network 300 and the higher-order feature representation $h_{t_i}^{enc}$ from the encoder 210. The joint network 230 generates a probability distribution $P(y_i|x_{t_i}, y_0, \ldots, y_{u_{i-1}})$ over possible speech recognition hypotheses at the corresponding time step. Here, the possible speech recognition hypotheses correspond to a set of output label that each represent a symbol character in a specified natural language. The probability distribution $P(y_i|x_{t_i}, y_0, \ldots, y_{u_{i-1}})$ over the possible speech recognition hypotheses indicates a probability for the final speech recognition result 120b (FIG. 1). That is, the joint network 230 determines the probability distribution for the final speech recognition result 120b using the single embedding vector 350 that is based on the sequence of non-blank symbols (e.g., initial speech recognition result 120a). The final Softmax layer 240 receives the probability distribution for the final speech recognition result 120b and selects the output label/symbol with the highest probability to produce the transcription.

The final speech recognition result 120b is presumed to be more accurate than the initial speech recognition result 120a because the RNN-T model 200 determines the initial speech recognition results 120a in a streaming fashion and the final speech recognition results 120b using the prior non-blank symbols from the initial speech recognition result 120a. That is, the final speech recognition results 120b take into account the prior non-blank symbols and thus are presumed more accurate because the initial speech recognition results 120a do not take into account any prior non-blank symbols. Moreover, the rescorer 180 (FIG. 1) may update the initial speech recognition result 120a with the final speech recognition result 120b to provide the transcription via the user interface generator 170 to the user 104.

In some implementations, to further reduce the size of the RNN-T decoder, i.e., the prediction network 300 and the joint network 230, parameter tying between the prediction network 300 and the joint network 230 is applied. Specifically, for a vocabulary size |V| and an embedding dimension $d_e$, the shared embedding matrix 304 at the prediction network is $E \in \mathbb{R}^{|V| \times d_e}$. Meanwhile, a last hidden layer includes a dimension size dh at the joint network 230, feed-forward projection weights from the hidden layer to the output logits will be $W \in \mathbb{R}^{d_h \times |V+1|}$, with an extra blank token in the vocabulary. Accordingly, the feed-forward layer corresponding to the last layer of the joint network 230 includes a weight matrix [$d_h$, |V|]. By having the prediction network 300 to tie the size of the embedding dimension $d_e$ to the dimensionality $d_h$ of the last hidden layer of the joint network 230, the feed-forward projection weights of the joint network 230 and the shared embedding matrix 304 of the prediction network 300 can share their weights for all non-blank symbols via a simple transpose transformation. Since the two matrices share all their values, the RNN-T decoder only needs to store the values once on memory, instead of storing two individual matrices. By setting the size of the embedding dimension $d_e$ equal to the size of the hidden layer dimension $d_h$, the RNN-T decoder reduces a number of parameters equal to the product of the embedding dimension $d_e$ and the vocabulary size |V|. This weight tying corresponds to a regularization technique.

Figure 4:
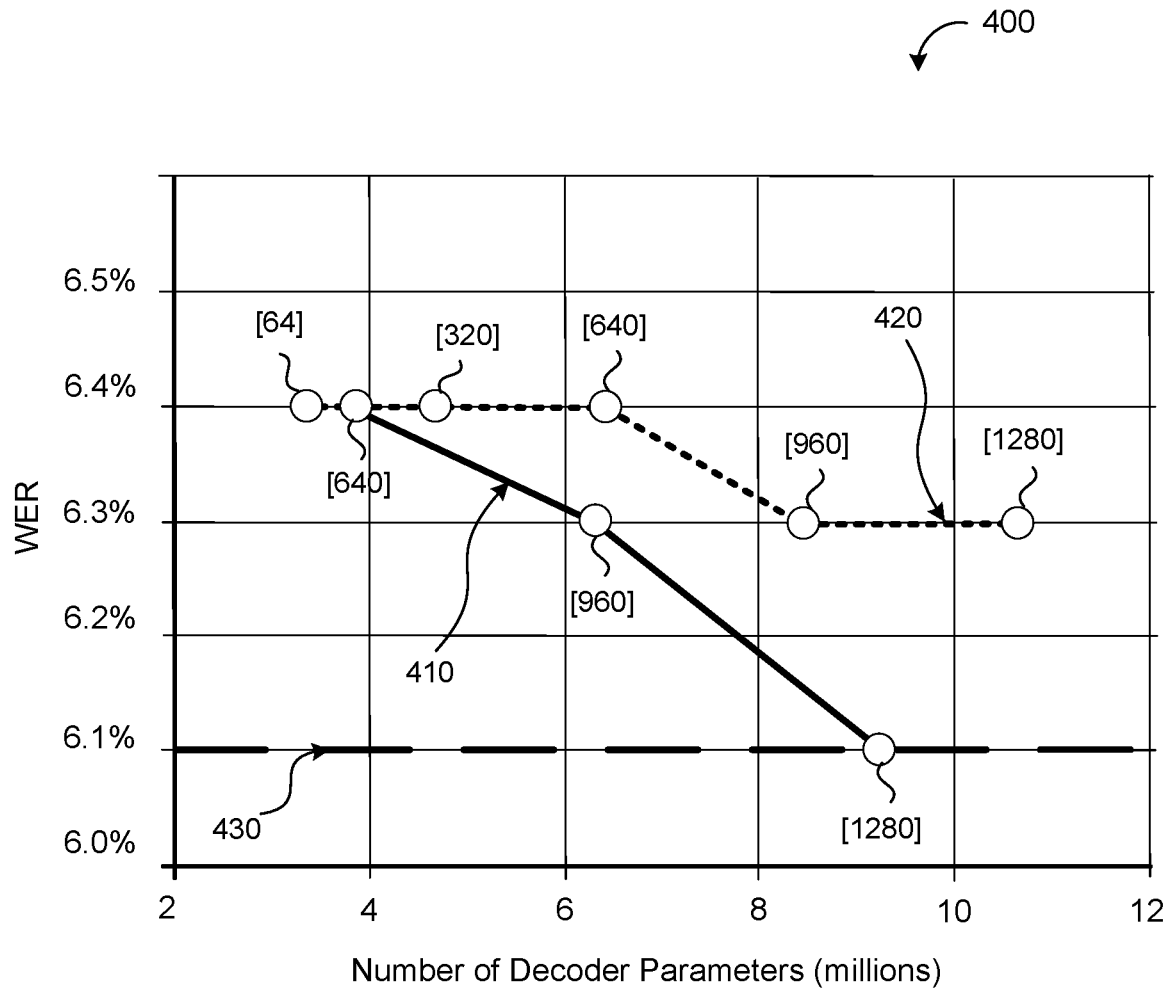
FIG. 4 is a plot depicting word error rate versus size of both tied and un-tied prediction and joint networks.

FIG. 4 is a plot 400 depicting word error rate (WER) versus the number of parameters of the RNN-T decoders. Here, FIG. 4 the plot 400 illustrates WER versus the number of parameters for a tied RNN-T decoder 410 (illustrated with the solid line), a non-tied RNN-T decoder 420 (illustrated with the dotted line), and a long-short term memory (LSTM) network 430 (illustrated with the dashed line). Specifically, the plot 400 depicts the size of the prediction and joint networks 300, 230 with and without tied output and embeddings. The plot 400 shows varying embedding dimensions de to perform a sweep over the model size. As shown in FIG. 4, the non-tied RNN-T decoder 420 includes four measurements including the embedding dimensions de of 64, 320, 640, 960, and 1280. Here, the tied RNN-T decoder 410 includes three measurements including the embedding dimensions of 640, 960, and 1280. In the non-tied RNN-T decoder 420 case, the last hidden layer of the joint network 230 always includes the dimensionality $d_h$ of size 640 (dimensionality $d_h$ not illustrated in the plot 400). In the tied RNN-T decoder 410 case, the plot 400 also shows the dimensionality $d_h$ (dimensionality $d_h$ not illustrated in the plot 400) of the last hidden layer of the joint network 230 equal to the size of the embedding dimension de of the prediction network 300 such that the size and performance of the RNN-T decoder is more sensitive to changes in that dimension. Accordingly, the results depicted by plot 400 indicate that weight-tying is more parameter efficient, thereby achieving better performance with fewer parameters. Additionally, for large-enough models using weight-tying, the same word error rate is reached as a conventional RNN-T decoder using the LSTM network 430.

Figure 5:
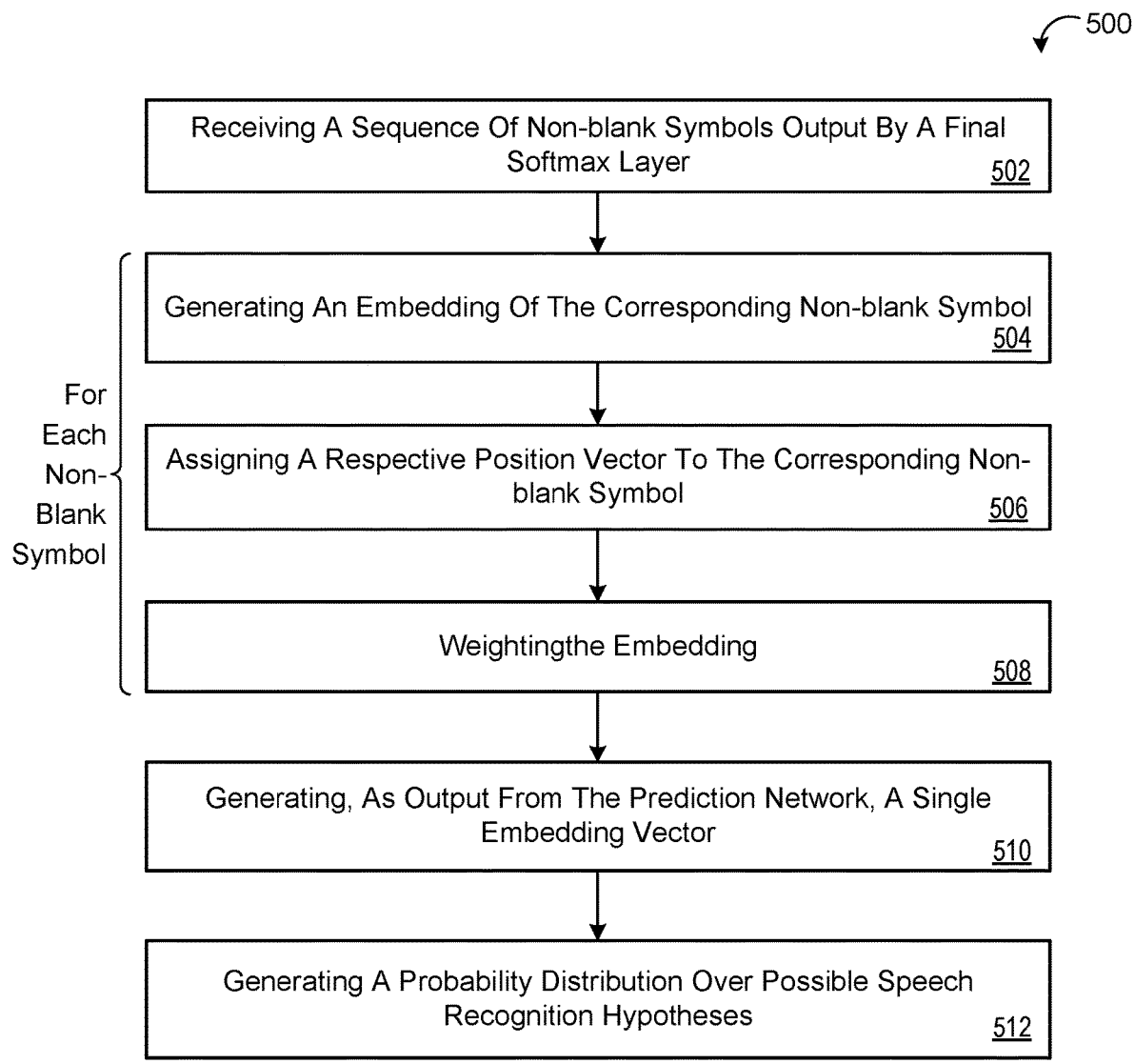
FIG. 5 is a flowchart of an example arrangement of operations for a computer-implemented method of executing a tied and reduced RNN-T model.

FIG. 5 is a flowchart of an exemplary arrangement of operations for a computer-implemented method 500 for executing a tied and reduced RNN-T model 200. At each of a plurality of time steps subsequent to an initial time step, the method 500 performs operations 502-512. At operation 502, the method 500 includes receiving, as input to a prediction network 300 of a recurrent neural network-transducer (RNN-T) model 200, a sequence of non-blank symbols 301, 301a-n $y_{ui-n}, \ldots, y_{ui-1}$ output by a final Softmax layer 240. For each non-blank symbol in the sequence of non-blank symbols received as input during the corresponding time step, the method 500 performs operations 504-508. At operation 504, the method 500 includes generating, by the prediction network 300, using a shared embedding matrix 304, an embedding 306 of the corresponding non-blank symbol. At operation 506, the method 500 includes assigning, by the prediction network 300, a respective position vector $PV_{Aa-An}$ 308, 308Aa-An to the corresponding non-blank symbol. At operation 508, the method 500 includes weighting, by the prediction network 300, the embedding 306 proportional to a similarity between the embedding 306 and the respective position vector 308.

At operation 510, the method 500 includes generating, as output from the prediction network 300, a single embedding vector 350 at the corresponding time step. Here, the single embedding vector 350 is based on a weighted average 318A-H of the weighted embeddings 312Aa-An. At operation 512, the method 500 includes generating, by a joint network 230 of the RNN-T model 200, using the single embedding vector 350 generated as output from the prediction network 300 at the corresponding time step, a probability distribution $P(y_i|x_{t_i}, y_0, \ldots, y_{u_{i-1}})$ over possible speech recognition hypotheses at the corresponding time step.

Figure 6:
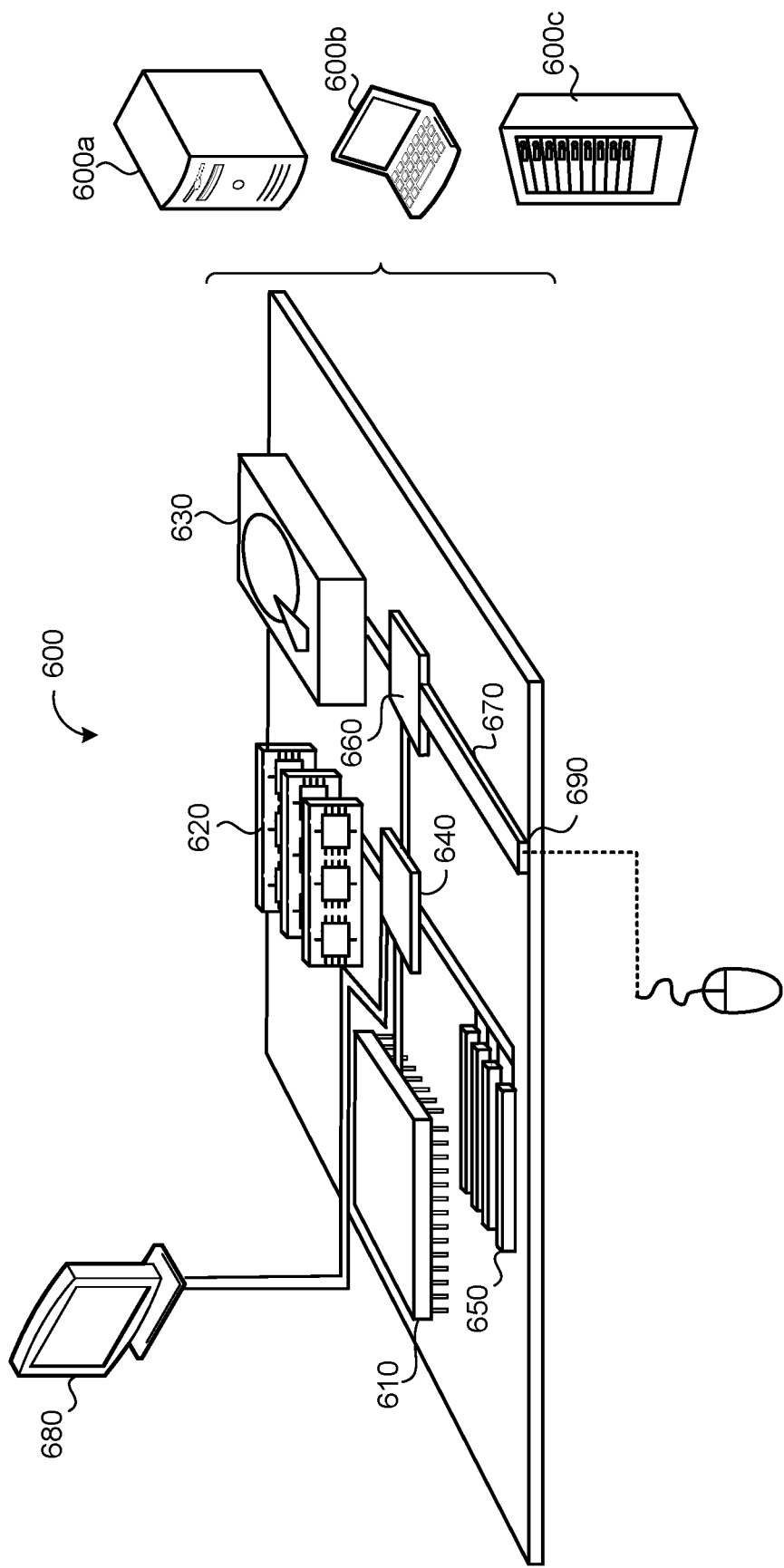
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600*a* or multiple times in a group of such servers 600*a*, as a laptop computer 600*b*, or as part of a rack server system 600*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware causes the data processing hardware to perform operations comprising:
at each of a plurality of time steps subsequent to an initial time step:
receiving, as input to a prediction network of a recurrent neural network-transducer (RNN-T) model, a sequence of non-blank symbols output by a final Softmax layer;
for each non-blank symbol in the sequence of non-blank symbols received as input at the corresponding time step:
generating, by the prediction network, using a shared embedding matrix, an embedding of the corresponding non-blank symbol; and
assigning, by the prediction network, a respective position vector to the corresponding non-blank symbol;
generating, by the prediction network, a sequence of the embeddings each weighted proportional to a similarity between the embedding and the respective position vector; and
generating, by a joint network of the RNN-T model, based on the sequence of the weighted embeddings generated by the prediction network at the corresponding time step, a probability distribution over possible speech recognition hypotheses at the corresponding time step; and
determining as output of the RNN-T model, a speech recognition result for the sequence of non-blank symbols based on the probability distribution over possible speech recognition hypotheses.

2. The computer-implemented method of claim 1, wherein the operations further comprise:
receiving, as input to an audio encoder of the RNN-T model, a sequence of acoustic frames;
generating, by the audio encoder, at each of the plurality of time steps, a higher order feature representation for a corresponding acoustic frame in the sequence of acoustic frames; and
receiving, as input to the joint network, the higher order feature representation generated by the audio encoder at the corresponding time step.

3. The computer-implemented method of claim 2, wherein the audio encoder comprises a plurality of conformer layers.

4. The computer-implemented method of claim 2, wherein the audio encoder comprises a plurality of transformer layers.

5. The computer-implemented method of claim 1, wherein the sequence of non-blank symbols output by the final Softmax layer comprise wordpieces.

6. The computer-implemented method of claim 1, wherein the sequence of non-blank symbols output by the final Softmax layer comprise graphemes.

7. The computer-implemented method of claim 1, wherein each of the embeddings comprise a same dimension size as each of the position vectors.

8. The computer-implemented method of claim 1, wherein the sequence of non-blank symbols received as input is limited to N previous non-blank symbols output by the final Softmax layer.

9. The computer-implemented method of claim 1, wherein the prediction network comprises a multi-headed attention mechanism, the multi-headed attention mechanism sharing the shared embedding matrix across each head of the multi-headed attention mechanism.

10. The computer-implemented method of claim 1, wherein the prediction network ties a dimensionality of the shared embedding matrix to a dimensionality of an output layer of the joint network.

11. A system comprising:
data processing hardware; and
memory hardware in communication with the data processing hardware and storing instructions that when executed on the data processing hardware causes the data processing hardware to perform operations comprising:
at each of a plurality of time steps subsequent to an initial time step:
receiving, as input to a prediction network of a recurrent neural network-transducer (RNN-T) model, a sequence of non-blank symbols output by a final Softmax layer;
for each non-blank symbol in the sequence of non-blank symbols received as input at the corresponding time step:
generating, by the prediction network, using a shared embedding matrix, an embedding of the corresponding non-blank symbol; and
assigning, by the prediction network, a respective position vector to the corresponding non-blank symbol;
generating, by the prediction network, at the corresponding time step, a sequence of the embeddings each weighted proportional to a similarity between the embedding and the respective position vector; and
generating, by a joint network of the RNN-T model, based on the sequence of the weighted embeddings generated by the prediction network at the corresponding time step, a probability distribution over possible speech recognition hypotheses at the corresponding time step; and
determining as output of the RNN-T model, a speech recognition result for the sequence of non-blank symbols based on the probability distribution over possible speech recognition hypotheses.

12. The system of claim 11, wherein the operations further comprise:
receiving, as input to an audio encoder of the RNN-T model, a sequence of acoustic frames;
generating, by the audio encoder, at each of the plurality of time steps, a higher order feature representation for a corresponding acoustic frame in the sequence of acoustic frames; and
receiving, as input to the joint network, the higher order feature representation generated by the audio encoder at the corresponding time step.

13. The system of claim 12, wherein the audio encoder comprises a plurality of conformer layers.

14. The system of claim 12, wherein the audio encoder comprises a plurality of transformer layers.

15. The system of claim 11, wherein the sequence of non-blank symbols output by the final Softmax layer comprise wordpieces.

16. The system of claim 11, wherein the sequence of non-blank symbols output by the final Softmax layer comprise graphemes.

17. The system of claim 11, wherein each of the embeddings comprise a same dimension size as each of the position vectors.

18. The system of claim 11, wherein the sequence of non-blank symbols received as input is limited to N previous non-blank symbols output by the final Softmax layer.

19. The system of claim 11, wherein the prediction network comprises a multi-headed attention mechanism, the multi-headed attention mechanism sharing the shared embedding matrix across each head of the multi-headed attention mechanism.

20. The system of claim 11, wherein the prediction network ties a dimensionality of the shared embedding matrix to a dimensionality of an output layer of the joint network.

\* \* \* \* \*